United States Patent
Giraud et al.

(10) Patent No.: US 7,460,918 B2
(45) Date of Patent: Dec. 2, 2008

(54) DEVICES AND METHODS FOR UPDATING THE PROGRAMMING OF A SYSTEM FOR CONTROLLING AN ELECTRIC ROTARY MACHINE

(75) Inventors: Regis Giraud, Angouleme (FR); Thierry Crespo, Voeuil et Giget (FR); Jean-Marc Petillon, Fleac (FR)

(73) Assignee: Moteurs Leroy-Somer, Angouleme (FR)

( * ) Notice: Subject to any disclaimer, the term of this patent is extended or adjusted under 35 U.S.C. 154(b) by 128 days.

(21) Appl. No.: 11/148,316

(22) Filed: Jun. 9, 2005

(65) Prior Publication Data
US 2005/0275366 A1   Dec. 15, 2005

Related U.S. Application Data

(60) Provisional application No. 60/579,286, filed on Jun. 15, 2004.

(30) Foreign Application Priority Data
Jun. 10, 2004   (FR)   .................................. 04 06296

(51) Int. Cl.
G05B 19/42   (2006.01)
(52) U.S. Cl. ...................................... 700/87
(58) Field of Classification Search ................... 700/18, 700/23, 87, 88, 170, 181, 253, 86, 17, 1, 700/2, 100, 4–5, 10; 318/568.1, 255, 568.23, 318/568.13; 713/1, 600; 711/103, 1, 2, 100, 711/4–5, 6; 361/752; 310/90.5; 365/185.25; 408/9; 717/100, 114, 151–152, 153, 174
See application file for complete search history.

(56) References Cited

U.S. PATENT DOCUMENTS

| | | | | |
|---|---|---|---|---|
| 3,752,039 A | * | 8/1973 | Hewins | 91/171 |
| 4,158,759 A | * | 6/1979 | Mason | 219/720 |
| 4,191,237 A | * | 3/1980 | Voege | 160/188 |
| 4,540,318 A | * | 9/1985 | Hornung et al. | 408/9 |
| 4,745,755 A | * | 5/1988 | Kawamura | 60/608 |

(Continued)

FOREIGN PATENT DOCUMENTS

DE   297 06 969 U1   7/1997

(Continued)

OTHER PUBLICATIONS

Integrated power drive systems Hardy-Bishop, B.A.; Electricity as a Business Resource, IEE Colloquium on Apr. 11, 1991 pp. 3/1-3/3.*

(Continued)

Primary Examiner—Michael B Holmes
(74) Attorney, Agent, or Firm—Oliff & Berridge, PLC

(57) ABSTRACT

A device may be configured for updating the programming of a control system of an electric rotary machine, the device having no screen. The device may include an electrical or optical connector element for connection to the control system, enabling data to be transferred between the device and the control system and a memory for containing data to be transferred into the control system and/or for loading data from the control system. The device may include a control member, with data being exchanged between the device and the control system in response to an action exerted manually on the control member.

41 Claims, 2 Drawing Sheets

U.S. PATENT DOCUMENTS

| | | | | |
|---|---|---|---|---|
| 4,894,991 A | * | 1/1990 | Kawamura | 60/608 |
| 4,920,948 A | * | 5/1990 | Koether et al. | 126/21 A |
| 5,160,244 A | * | 11/1992 | Kuwabara et al. | 417/36 |
| 5,212,789 A | * | 5/1993 | Rago | 707/8 |
| 5,245,257 A | * | 9/1993 | Tobise | 318/255 |
| 5,458,098 A | * | 10/1995 | Yagi et al. | 123/179.3 |
| 5,535,342 A | * | 7/1996 | Taylor | 710/315 |
| 5,616,894 A | | 4/1997 | Nieminen et al. | |
| 5,754,475 A | * | 5/1998 | Bill et al. | 365/185.25 |
| 5,903,073 A | * | 5/1999 | Mukai | 310/64 |
| 6,194,865 B1 | * | 2/2001 | Mitsui et al. | 318/811 |
| 6,351,048 B1 | * | 2/2002 | Schob et al. | 310/90.5 |
| 6,424,378 B1 | * | 7/2002 | Crespo et al. | 348/465 |
| 6,462,430 B1 | * | 10/2002 | Joong et al. | 290/40 C |
| 6,466,827 B1 | * | 10/2002 | Stine | 700/18 |
| 6,472,785 B2 | * | 10/2002 | Petit et al. | 310/71 |
| 6,480,404 B2 | * | 11/2002 | Giraud et al. | 363/124 |
| 6,545,372 B2 | * | 4/2003 | Hanyu et al. | 290/41 |
| 6,545,720 B1 | * | 4/2003 | Tauzia et al. | 348/468 |
| 6,555,984 B1 | * | 4/2003 | Rajala et al. | 318/569 |
| 6,563,246 B1 | * | 5/2003 | Kajiura et al. | 310/162 |
| 6,577,022 B2 | * | 6/2003 | Joong et al. | 290/40 C |
| 6,607,124 B1 | * | 8/2003 | Junkins et al. | 235/379 |
| 6,655,932 B1 | * | 12/2003 | Stinessen et al. | 417/423.1 |
| 6,687,814 B1 | * | 2/2004 | Duppong | 713/1 |
| 6,697,579 B2 | * | 2/2004 | Ito et al. | 399/13 |
| 6,713,990 B1 | * | 3/2004 | Yamada | 322/23 |
| 6,722,230 B2 | * | 4/2004 | Sakamoto et al. | 74/661 |
| 6,798,104 B2 | * | 9/2004 | Kajiura et al. | 310/162 |
| 6,819,011 B2 | * | 11/2004 | Kernahan et al. | 307/35 |
| 6,825,625 B1 | | 11/2004 | Karwath et al. | |
| 6,833,646 B2 | * | 12/2004 | Joong et al. | 310/114 |
| 6,867,560 B2 | * | 3/2005 | Arimitsu | 318/144 |
| 6,886,647 B1 | * | 5/2005 | Gotta | 180/65.1 |
| 7,005,819 B2 | * | 2/2006 | Takai et al. | 318/400.02 |
| 7,062,335 B2 | * | 6/2006 | Klindt et al. | 700/83 |
| 7,165,470 B2 | * | 1/2007 | Sakamoto et al. | 74/339 |
| 7,167,761 B2 | * | 1/2007 | Wise et al. | 700/66 |
| 7,185,722 B1 | * | 3/2007 | Sakamoto et al. | 180/65.2 |
| 7,291,080 B2 | * | 11/2007 | Minagawa et al. | 475/5 |
| 2002/0044429 A1 | * | 4/2002 | Boucheron et al. | 361/752 |
| 2002/0147882 A1 | * | 10/2002 | Pua et al. | 711/103 |
| 2004/0193295 A1 | * | 9/2004 | Kaneko | 700/87 |
| 2005/0034116 A1 | * | 2/2005 | Rodriguez et al. | 717/174 |
| 2005/0035733 A1 | | 2/2005 | Karwath et al. | |
| 2005/0203645 A1 | * | 9/2005 | Klopfer et al. | 700/79 |
| 2005/0208967 A1 | * | 9/2005 | Buniatyan | 455/557 |

FOREIGN PATENT DOCUMENTS

| | | |
|---|---|---|
| DE | 198 17 566 A1 | 10/1999 |
| FR | 2 704 333 | 10/1994 |
| WO | WO 99/66633 | 12/1999 |
| WO | WO 00/05806 | 2/2000 |

OTHER PUBLICATIONS

Diagnostic measurements on rotary arcs in hollow polymeric cylinders Mori, T.; Spencer, J.W.; Humphries, J.; Jones, G.R.; Power Delivery, IEEE Transactions on vol. 20, Issue 2, Part 1, Apr. 2005 pp. 765-771 Digital Object Identifier 10.1109/TPWRD.2004.838635.*
Magnetic rotary position encoders with magneto-resistive sensors Campbell, P.; Electrical Machines and Drives, 1989. Fourth International Conference on Sep. 13-15, 1989 pp. 359-363.*

* cited by examiner

DEVICES AND METHODS FOR UPDATING THE PROGRAMMING OF A SYSTEM FOR CONTROLLING AN ELECTRIC ROTARY MACHINE

CROSS-REFERENCE TO RELATED APPLICATIONS

This non-provisional application claims the benefit of French Application No. 04 06296 filed on Jun. 10, 2004, and U.S. Provisional Application No. 60/579,286 filed on Jun. 15, 2004, the entire disclosures of which are incorporated herein by reference.

BACKGROUND

The present invention relates to data transfer devices, for example, suitable for use in updating the programming of a system for controlling an electric rotary machine, such as an electric motor.

Control systems typically include a memory containing values for operating parameters of a machine. These operating parameters may include parameters that govern acceleration and deceleration ranges of the machine. The parameters may include, for example, information needed to enable the machine to be controlled efficiently and may control certain characteristics of the machine, for example, its nominal voltage, power, and speed. The values may be numerous.

When these values need to be modified, a control system may be connected to a portable computer over a cable. Software running on the computer, for example, may be used to update the control system.

Alternatively, the values may be modified, for example, by using a specific console, rather than a computer. The specific console may have a liquid crystal screen or display patterns with at least seven segments. The specific console my have a keypad enabling values to be input and/or values displayed on the screen to be modified.

Proposals have also been made to modify the operational values by using a memory card containing replacement values for operating parameters. The memory card may be connected to the control system in order to transfer data. To enable a user to carry out operations needed to read the memory card, a control system must be fitted with a keypad and a screen suitable for displaying alphanumeric characters.

SUMMARY

However, there are a number of problems with these conventional methods of updating control systems. For example, modifying the values using a portable computer and software requires a specialist operator, thereby increasing the overall cost of operating the machine. Substantial cost is involved in acquiring a specific console and an operator needs to be trained in how to use the console. Thus, use of a specific console that might be cost prohibitive, for example, in respect of a one-off control system. Conventional memory cards may only be used with control systems having both a keypad and a screen. Unfortunately, such control systems are not in widespread use, in particular because they cost more and are less reliable in difficult environments.

Consequently, there exists a need to facilitate updating the programming of control systems without keypads or screens. There also exists a need to facilitate updating the programming of control systems with little risk of error, for example, accidentally loading data intended for some other control system.

Exemplary embodiments of the invention may provide a device for updating the programming of a control system of an electric rotary machine, the device having no screen. Exemplary devices may include an electrical or optical connector element for connection to the control system, enabling data to be transferred between the device and the control system and a memory for containing data to be transferred into the control system and/or for loading data from the control system. Exemplary devices may include a control member, data being exchanged between the device and the control system in response to an action exerted manually on the control member.

BRIEF DESCRIPTION OF THE DRAWINGS

The broad spirit and scope of the invention is be described in the context of various exemplary embodiments, with reference to the accompanying drawings, wherein.

DETAILED DESCRIPTION OF EMBODIMENTS

Figure 1:
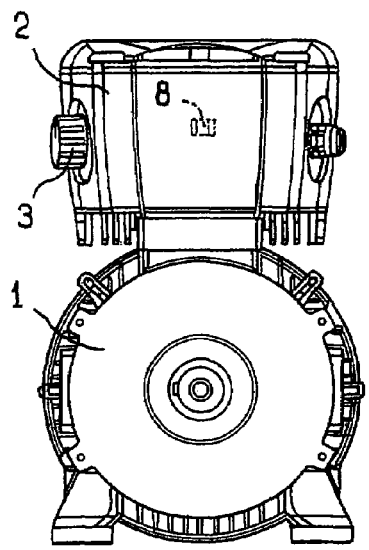
FIG. 1 is an elevation view of an exemplary electric rotary machine fitted with a control system.

FIG. 1 shows an electric rotary machine 1, such as an electric motor, for example, which may be controlled by a control system 2. For example, the control system 2 is shown as a variable speed controller enabling the speed of the motor to be varied, at least during a starting stage. However, the control system 2 may also be, for example, a starter, or any other control, protection, or monitoring member.

Figure 2:
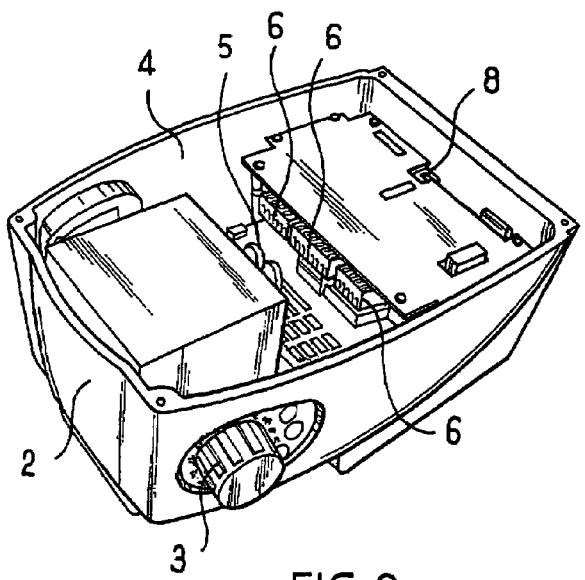
FIG. 2 is a view in isolation, as seen from below, showing the control system of FIG. 1 separated from the rotary machine.

As shown in FIG. 2, the exemplary control system 2 may include a rotary knob 3 that is directly accessible to the user. The user may turn the knob 3, for example, to select a particular speed of rotation. The exemplary control system 2 may not have a screen. For example, the control system 2 may not have a liquid crystal display or a display with display patterns having seven or more segments. The exemplary control system 2 may not have a keypad. For example, the control system 2 may not have a keypad with at least five keys for navigating through a menu.

As shown in FIG. 2, the case 4 of the control system 2 may house a set of electronic cards including terminal strips 6 enabling the control system 2 to be connected to external components.

Figure 3:
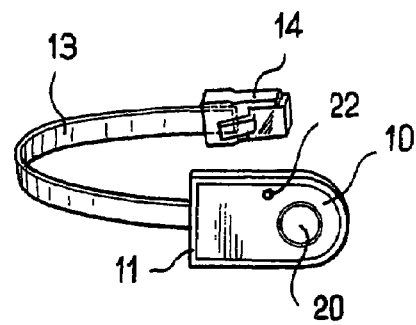
FIG. 3 shows an exemplary data transfer device in isolation.

The control system 2 may have a connector 8, for example, a female connector having the commercial reference RJ45. The connector 8 may be suitable for connection to a data transfer device 10 (for example, shown in FIG. 3), possibly via a suitable extension lead, where necessary or desired. The connector may have five working pins, thereby leaving other pins available on the control system for connection to some other device, for example, a console having a screen, or a computer.

The data transfer device 10 may include a case 11 housing a printed circuit 12 carrying electronic components. The printed circuit 12 may be connected by a cable 13 to a connector 14, which may be, for example, a male plug having the commercial reference RJ45.

Figure 4:
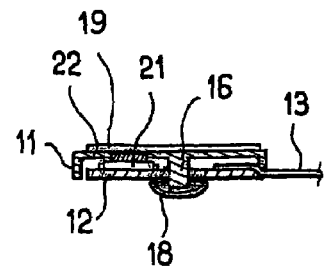
FIG. 4 is a fragmentary longitudinal cross-sectional view of the device of FIG. 3.

The case 11 may have an open side, as shown in FIG. 4. The case 11 may include a stud 16 on which the printed circuit 12 is engaged. A stop washer 18 may be fastened to the stud 16 so as to hold the printed circuit 12 in the case 11.

In the exemplary embodiment, the case 11 may also be covered in a flexible film 19. The printed circuit 12 may include a pushbutton 21 extending through an opening 22 of the case 11, and the pushbutton 21 may be actuated, for example, by the user actuating a control member, such as for example, pressing on a key 20 formed in the film 19.

The printed circuit 12 may carry an indicator light 22, for example, constituted by a LED. The film 19 may include a transparent region enabling light emitted thereby to be seen via an opening in the case 11.

Figure 5:
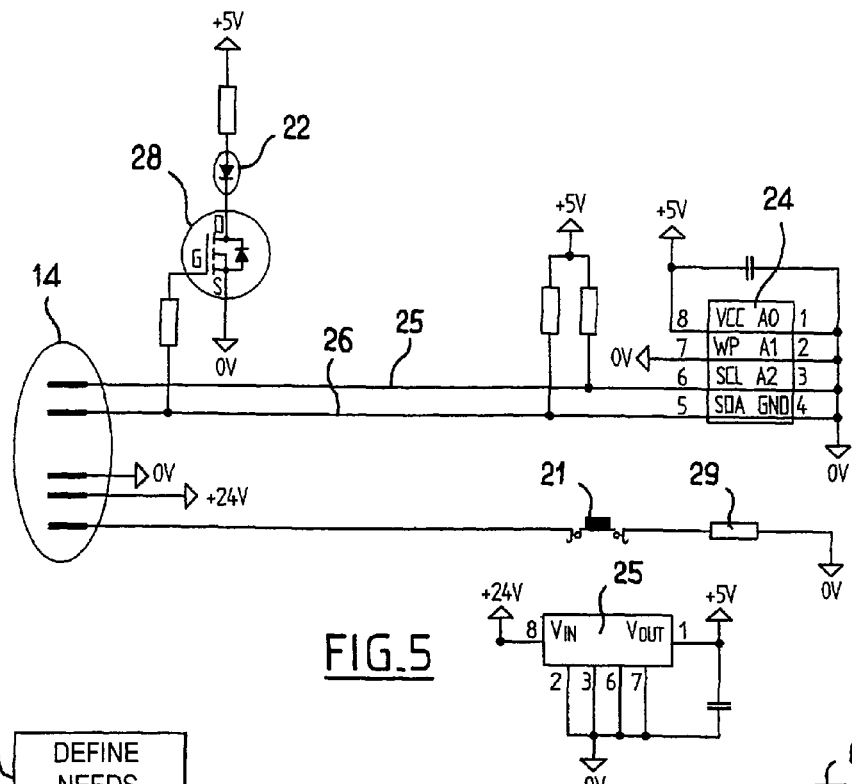
FIG. 5 is an exemplary electrical circuit diagram of the data transfer device.

As shown in FIG. 5, the device 10 may include a conventional integrated circuit 24, for example, of the EEPROM type (e.g., having commercial reference 24C16). The integrated circuit 24 may be fed with +5 volts from a regulator 25 and may include a memory suitable for exchanging data with the control system 2 via, for example, a line. The memory may have a capacity greater than or equal to 8 megabytes (MB), or greater than or equal to 16 MB. The line may have two wires 25 and 26, for example, connected respectively to outputs SCL and SDA of the circuit 24. The LED 22 may be powered by a transistor 28 controlled by the wire 26.

Two pins of the connector 14 may be respectively connected to the wires 25 and 26. Three other pins may be respectively connected to 0 volts, to the input of the voltage regulator 25, and to the pushbutton 21. The pushbutton 21 may be connected in series with a resistor 29 to the 0 volt connection.

Thus, in the exemplary embodiment, the control system 2 may be arranged to supply electrical power to the integrated circuit, and to the LED 22. The control system 2 may also be arranged to detect the ON or OFF state of the pushbutton 21.

The circuit 24 may store data corresponding to operating parameters for the control system 2. These operating parameters may be, for example, values for parameters serving to control an acceleration or deceleration range of the rotary machine 1 and/or values giving information about the characteristics of the machine (e.g., its nominal voltage, power, and speed).

Figure 6:
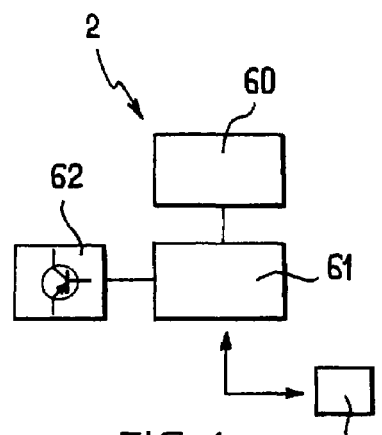
FIG. 6 is a block diagram of an exemplary assembly including the control system and the data transfer device.

The control system 2 may include at least one memory 60, for example, shown diagrammatically in FIG. 6. The data governing the operation of the electric rotary machine 1 may be programmed in the memory 60, the memory 60 being suitable for update by the data transfer device 10.

The control system 2 may also have at least one controller 67 such as, for example, a microcontroller or a microprocessor, and the associated peripheral components. The controller 67 may serve to control the operation of the electric rotary machine 1, and may, for example, generate signals for controlling the power electronics 62 that power the rotary machine 1. The controller 67 may serve to process information coming from sensors or other associated components.

The control system 2 may be arranged to enable the programming of its memory 60 (e.g., updated by the data transfer device 10) when a specific action is exerted on the key 20. The specific action may be, for example, two successive presses of key 20.

In the exemplary embodiment, the control system may be arranged to verify that two successive presses are performed in a predefined time interval, for example, within 0.5 seconds to 10 seconds. Thus, for example, two presses exerted in succession with a time lapse of more than 10 seconds between them will not cause data to be transferred.

Accordingly, the risk of accidentally transferring the wrong data can be kept small since merely connecting the device to the control system does not suffice to cause data to be transferred and the programming of the control system to be updated. The user must perform a voluntary action. Furthermore, the second press must be exerted quite quickly, thereby enabling an operator who has made a first press by mistake to avoid the transfer operation merely by taking care not to press a second time until said time interval has elapsed.

Figures 7, 8, 9:
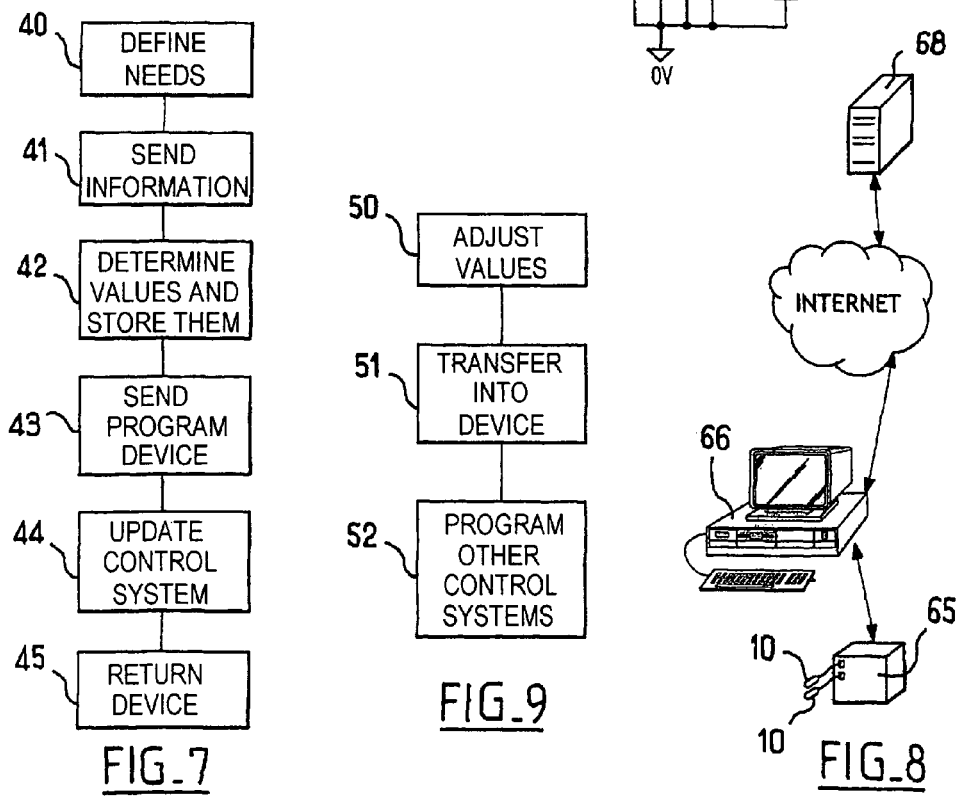
FIG. 7 is a block diagram showing an exemplary implementation of the data transfer device.
FIG. 8 illustrates data being downloaded from the Internet into at least one data transfer device.
FIG. 9 is a block diagram showing another exemplary implementation of the data transfer device.

The data transfer device 10 may be arranged to implement a data transfer method, for example, according to the exemplary method shown in FIG. 7. As shown in FIG. 7, operation of the method begins in step 40 where a user of the electric rotary machine 1 and the associated control system 2 may define requirements in terms of, for example, operating speeds for the rotary machine 1. Then, in step 41, those requirements may be sent to, for example, the manufacturer or the distributor of the control system and the rotary machine. These requirements may be sent, for example, by e-mail.

The distributor or the manufacturer may then determine the values to be programmed in the control system 2. In step 42, the values may be stored in the integrated circuit 24. In step 43, the device 10 may be sent to the user. As a result, in step 44, the user need only connect the device 10 to the control system 2. Once connected, the user may, for example, press twice in succession on the key 20 (e.g., with a pause of about one second between the two presses) to cause the setting data contained in the memory of the device 10 to be transferred into the control system 2 and stored therein.

In the exemplary embodiment, while data is being transferred, the light 22 may flash, and once the transfer has been completed, it may remain steadily on.

Once the transfer has been performed, the user may withdraw the device 10. As a result of the exemplary method, the control system 2 may be ready to operate with the new programming corresponding to the data that has just been loaded.

Optionally, in step 45, the user may return the device 10 to the manufacturer or to the distributor.

The control system 2 may be arranged in such a manner that, once the data contained in the device 10 has been transferred, information is sent back to the device 10 and stored therein. The sent back information may include, for example, information associated with maintenance of the electric rotary machine 1 and/or of the control system 2. This information may include, for example, by a number of hours of running time. Accordingly, this information may be used to enable the manufacturer or the distributor to warn the user when maintenance needs to be carried out, so as to avoid malfunction. The information may be used to optimize operation by allowing the manufacturer or the distributor to modify certain settings again.

For a user or a distributor already possessing a data transfer device 10, the device may be programmed remotely over an interface 65, as shown in FIG. 10. The interface 65 may be connected, for example, to a computer 66 connected to the Internet.

Data needed for programming the data transfer device 10 may be sent from, for example, a server 68 of an Internet site. The Internet site, for example, may be operated by the manufacturer of the control system 2.

The interface 65 may exchange data with the computer 66 using, for example, a first protocol (e.g., RS232) and may be configured to exchange data with the data transfer device(s) 10 connected thereto using, for example, a second protocol, different from the first (e.g., I2C).

The interface 65 may also be used solely with the computer 66 with the data for programming the transfer device 10 being information keyed into, or otherwise stored in, the computer.

The software used for programming data may prompt the user for the category of the rotary machine 1 and/or the corresponding control system 2 and may automatically store in the data transfer device 10 an identity code that is specific thereto. The identity code, for example, must then be recognized by the control system 2 prior to any modification to the programming thereof.

Thus, prior to any modification of the programming, the control system 2 may check that a predefined identification code is contained in the memory of the device 10. By checking the code, the control system 2 may insure that the data to be transferred from the device 10 to the control system 2 is acceptable. This may be useful, for example, to avoid loading unsuitable data into the control system 2, for example, due to human error supposing that one device 10 has been used instead of another.

The device 10 may also be used for duplicating the values of operating parameters of the control system 2 in some other control system 2. This may be done for example, according to the exemplary method shown in FIG. 9. As shown in FIG. 9, operation of the method begins in step 50, where a user may adjust the values of certain parameters in a first control system 2. This may be done, for example, using a setting console or a computer to optimize operation of the associated electric machine 1.

Thereafter, in step 51, the user may transfer the data corresponding to the parameters into the device 10. In step 52, the user may program other control systems 2 with the same parameters, using the device 10 on each occasion.

It may thus be easy to take the programming of a control system that is judged to have been optimized, for example, a system associated with one manufacturing line, and duplicate the programming in other control systems fitted to manufacturing lines that are identical or similar, without it being necessary to perform complex manipulations and run the associated risks of error.

While various features have been described in conjunction with the exemplary embodiments outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, it is possible to make the controller 67 differently. It is possible to exchange data between the device 10 and the control system 2 other than via a wired link. For example, data may be transferred over an infrared link.

The control system 2 may be modified to present the connector 8 on a front plate, as shown in dashed lines in FIG. 1. Accordingly, a user may connect the data transfer device 10 to the control system 2 without needing to take the control system 2 apart.

The device 10 need not have its own electrical power supply, and the control system 2 may be arranged to power the device electrically. This means there is no need to provide the device 10 with an optionally rechargeable battery.

The connector may have pins for exchanging data with a computer or a console using a protocol that is different from that used for exchanging data between the device and the control system.

The action that needs to be exerted on the control member to cause data to be transferred may be other than two presses. For example, the action may be a long press of duration in excess of 1 second. The device 10 may also be made without a flexible cable between the case and the connection element of the control system. For example, the connector 14 may be carried directly by the printed circuit 12.

The above data transfer device 10 may be utilized with a range of control systems for electric rotary machines 1 having similar control systems 2. A set of data transfer devices 10, associated with the control systems may contain respectively different operating data. The data transfer devices 10 thus make it easy to program the control systems with specific data. For example, this may make it possible for the control systems to be varied to enlarge the range of systems commercially offered.

Similarly, the data transfer device 10 may be utilized within an industrial method in which electric rotary machines are controlled by respective control systems. According to the method, operating parameters may initially be determined with one of the machines and may subsequently be loaded into a device 10 prior to being transferred to at least one other control system associated with another machine.

Throughout the description the term "include" should be understood as being synonymous with "including at least one" unless specified to the contrary.

Although the present invention herein has been described with reference to particular exemplary embodiments, it is to be understood that such embodiments are merely illustrative of the broad spirit and scope of the underlying principles. It is therefore to be understood that numerous modifications may be made to the exemplary embodiments and that other arrangements may be devised without departing from the broad spirit and scope of the underlying principles.

What is claimed is:

1. A device for updating the programming of a control system of an electric rotary machine, the device having no screen and comprising: at least one of an electrical connector element and an optical connector element for connection to the control system, enabling data to be transferred between the device and the control system; a memory for at least one of containing data to be transferred into the control system and loading data from the control system; and a control member, wherein data being exchanged between the device and the control system in response to an action exerted manually on the control member, and wherein the control system is one of a variable speed controller and a starter.

2. A device according to claim 1, wherein the control member comprises a key.

3. A device according to claim 2, wherein the key is a single key.

4. A device according to claim 2, wherein the key comprises a pushbutton.

5. A device according to claim 1, further comprising an LED, wherein the LED emits as a function of an extent to which data transfer has been accomplished.

6. A device according to claim 5, wherein the LED flashes during data transfer and shines steadily after transfer has been completed.

7. A device according to claim 1, wherein the action exerted manually on the control member comprises two presses on the single key with a predefined time interval between the presses.

8. A device according to claim 7, wherein the predefined time interval lies in a range from about 0.5 seconds to about 10 seconds.

9. A device for updating a programming of a control system of an electric rotary machine, the device having no screen and comprising:
   at least one of an electrical connector element and an optical connector element for connection to the control system, enabling data to be transfered between the device and the control system;
   a memory for at least one of containing data to be transferred into the control system and loading data from the control system; and
   a control member,
   wherein data is exchanged between the device and the control system in response to an action exerted manually on the control member, and
   wherein the device is configured to transfer data to the control system.

10. A device according to claim 9, wherein the data relates to at least one of operating parameters of the machine and characteristics of the machine.

11. A device according to claim 1, wherein the electrical connector element comprises an electrical connector.

12. A device according to claim 11, wherein the connector comprises five working pins.

13. A device according to claim 1, wherein the memory comprises an EEPROM integrated circuit.

14. A device according to claim 1, further comprising a case with an open face.

15. A device according to claim 14, wherein the case comprises a stud integrally molded therewith, with a printed circuit being engaged thereon.

16. A device according to claim 11, further comprising a flexible cable between the electrical connector and a case.

17. A device according to claim 1, wherein the memory has a capacity of at least 8 MB.

18. The device according to claim 1, wherein the device is incorporated into equipment, the equipment comprising the control system.

19. The device according to claim 18, wherein the data contained in the memory comprises an identification code specific to a predefined category of at least one of rotary machines and control systems, and wherein the control system is configured to prevent data transfer unless the code is recognized.

20. The device according to claim 18 wherein the control system is configured to modify data contained in the memory of the device after the data transfer operation has been completed.

21. The device according to claim 18, wherein the control system is configured to read a state of the control member.

22. The device according to claim 18, wherein:
   the device does not have its own electrical power supply, and
   the control system is configured to electrically power the device.

23. The device according to claim 18, wherein the device is configured to communicate with the control system using I2C protocol.

24. The device according to claim 18, wherein the control system further comprises a connector suitable for receiving the connector element.

25. The device according to claim 24, wherein the connector is accessible without removing a protective cover.

26. The device according to claim 18, wherein the connector comprises pins enabling data to be transferred using a second protocol different from the protocol used for exchanging data between the device and the control system.

27. The device according to claim 18, wherein the control system is configured to act on the speed of rotation of an electric motor, at least during a starting stage.

28. The device according to claim 18, wherein the control system does not have a liquid crystal screen or a screen with display patterns having seven or more segments.

29. The device according to claim 18, wherein the control system does not have a screen.

30. The device according to claim 18, wherein the control system does not have a keypad.

31. The device according to claim 18, wherein the control system is secured to the electric machine.

32. The device according to claim 18, wherein the control system comprises a memory containing the data needed for operation of the rotary machine.

33. A range of control systems for electric rotary machines, comprising:
   control systems; and
   more than one of a device for updating a programming of the control systems of an electric rotary machine, each device having no screen and comprising:
      at least one of an electrical connector element and an optical connector element for connection to the control systems, enabling data to be transfered between the device and the control systems;
      a control member,
      each of the devices being associated with a corresponding one of the control system, and each of the devices containing different operating data,
   wherein data is exchanged between each of the devices and the corresponding one of the control systems in response to an action exerted manually on the control member.

34. A method for using a device for updating a programming of a control system of an electric rotary machine, the device having no screen and comprising at least one of an electrical connector element and an optical connector element for connection to the control system, enabling data to be transferred between the device and the control system, memory for at least one of containing data to be transferred into the control system and loading data from the control system, and a control member, wherein date is exchanged between the device and the control system in response to an action exerted manually on the control member, in which electric rotary machines are controlled by respective control systems, the method comprising:
   determining operating parameters of the machines;
   transferring the determined operating parameters to the device: and
   transferring the operating parameters on the device to a control system associated with another rotary machine.

35. A method for using a device for updating a programming of a control system of an electric rotary machine, the device having no screen and comprising at least one of an electrical connector element and an optical connector element for connection to the control system, enabling data to be transferred between the device and the control system, a memory for at least one of containing data to be transferred into the control system and loading data from the control system, and a control member, wherein data is exchanged btween the device and the control system in response to an action exerted manually on the control member, to update a least one operating parameter of a control system of at least one electric rotary machine, the method comprising:
loading data associated with said operating parameter into the memory of a device; and
transferring the loaded data associated with said operating parameter into the control system.

36. The method according to claim 35, further comprising:
loading, after the data associated with said operating parameter has been transferred, data associated with the operation of the machine into the device.

37. The method according to claim 36, wherein loading the data associated with the operating parameter into the memory of the device comprises loading information useful for maintenance purposes into the memory of the device.ata transfer device.

38. The method according to claim 35, wherein loading the data associated with the operating parameter into the memory of the device comprises loading data downloaded from an Internet site into the memory of the device.

39. The method according to claim 35, wherein loading the data associated with the operating parameter into the memory of the device comprises loading the data associated with the operating parameter into the memory of the device via an interface, the interface enabling data to be received using a first protocol and data to be transferred to the device using a second protocol.

40. The method according to claim 35, wherein:
loading the data associated with the operating parameter into the memory of the data transfer device comprises loading the data associated with the operating parameter into the memory of the device after selecting a control system category from a plurality of categories; and
the loaded data includes an identification code specific to each category of control system.

41. The device according to claim 17, wherein the memory has a capacity of at least 16 MB.

\* \* \* \* \*